United States Patent [19]

Linteris

[11] 3,721,570
[45] March 20, 1973

[54] MILK-FREE MARGARINE
[75] Inventor: Lino L. Linteris, Demarest, N.J.
[73] Assignee: Lever Brothers Company, New York, N.Y.
[22] Filed: July 20, 1971
[21] Appl. No.: 164,454

[52] U.S. Cl. ................................. 99/123, 99/122 R
[51] Int. Cl. ............................................. A23d 3/02
[58] Field of Search ....99/118 R, 122 R, 122 M, 123, 99/20

[56] References Cited

UNITED STATES PATENTS 2,622,984   12/1952   Peebles et al. ................... 99/118 R X
3,420,811   1/1969    Van Wieren et al. ................ 99/20 X Primary Examiner—Raymond N. Jones
Assistant Examiner—James Robert Hoffman
Attorney—Louis F. Kline, Jr. et al.

[57] ABSTRACT

Milk-free margarines, unlike margarines having milk solids in the aqueous phase, have little tendency to discolor when used for frying but have the undesirable attribute of a reduced salt sensation, and the reduction is counteracted by the presence of very small amounts of sodium caseinate.

5 Claims, No Drawings

MILK-FREE MARGARINE

BACKGROUND OF THE INVENTION

1. Field of the Invention

Commercial margarines contemporarily produced are wholesome and nutritious, and are in demand as spreads and as shortenings in the baking art. Important among the uses of margarine is its use as a frying fat. However margarines as customarily manufactured having milk or the equivalent thereof as milk solids and water, skim milk, etc. at a milk solids level of about 1.4–1.6 percent, when used for frying foods are prone to stick to the frying pan and to develop an unsightly burned or carbonized appearance. This undesirable appearance is evident not only in the heated margarine in the frying pan, but in the fried food.

The aforementioned undesirable characteristics are eliminated when milk solids are removed from the margarine composition. At the present time Federal Standards of Identity permit the complete absence of milk solids in margarine, although a partial reduction is not permitted.

Although burning and discoloration are substantially absent in milk-free margarines, such margarines suffer from the defect of a lower over-all salt sensation at the 1.5–2 percent salt level, a level that is customary and adequate in most milk margarines.

The problem of reduced salt sensation at a 1.5–2 percent salt level in milk-free margarines can be overcome by increasing the percentage level of NaCl but levels of 3.5 to 5 percent would be required. Salt at this level tends to produce a bitter after-taste and may not be nutritionally desirable. In addition when the margarine is consumed in a melted state, as for example on hot foods, such as toast or potatoes, the taste at the higher salt concentrations becomes objectionable.

2. The Prior Art

The utility of sodium caseinate in milk-free margarine has not hitherto been recognized, and sodium caseinate is at the present time not included in the list of permissible additives in the Standards of Identity of the Food and Drug Administration.

Sodium caseinate has been disclosed as an emulsion disruptor in Dutch Patent No. 93,297, dated Jan. 15, 1960, abstracted in C.A. 55 6891e. However unlike in the instant invention, the described process relates to a complete breaking of an emulsion.

The utility of sodium caseinate in promoting a water-in-oil emulsion is described in C.A. 53 7454b.

U.S. Pat. No. 1,412,462, issued Apr. 11, 1922 discloses that calcium caseinate has a saline taste.

U.S. Pat. No. 3,266,904, issued Aug. 16, 1966 discloses a low-caloric spread which has not more than 60 percent fat, and contains 4–20 percent sodium caseinate added for its value as a protein component.

U.S. Pat. No. 3,314,798, which issued Apr. 18, 1967, relates to low-caloric spreads containing milk or cream. In these compositions the fat content ranges from 22 to 55 percent and the sodium caseinate from 0.75 to 1 percent.

The use of 1 to 3 percent alkali caseinate in an emulsion containing 10–50 percent fat with milk as the aqueous phase is disclosed in C.A. 62 4534b, (1965) referring to Netherlands Application 6,403,486, which issued Oct. 6, 1964.

SUMMARY OF THE INVENTION

It has now been discovered that milk-free margarine can be prepared which has the advantage of a salt sensation equivalent to the level imparted by 2 percent sodium chloride in a margarine having milk as the aqueous phase, while also having the advantage that substantially no burning or sticking occurs when the margarine is used for frying.

By "salt sensation" is meant the organoleptic effect associated with the saline effect of sodium chloride on the gustatory receptors.

It is an object of the present invention to provide a milk-free margarine having an acceptable salt sensation and which is free from substantial burning and sticking in a frying operation.

It is another object of the invention to potentiate the salty taste in milk-free margarines to permit the use of salt levels no higher than normal therein for the purpose of providing an adequate salt sensation.

It is a further object of the invention to reduce the carbonization and discoloration of margarines when used as frying fats without adversely affecting salt sensation or flavor stability upon storage.

The objects of the invention are accomplished by incorporating very low levels of sodium caseinate in a milk-free margarine wherein water comprises the aqueous phase.

Accordingly the invention provides a margarine that is free from milk components, which does not suffer from a low level of salt sensation characteristic of milk-free margarines outside the instant invention.

The invention further provides a process for enhancing or potentiating the salt sensation of milk-free margarine which comprises incorporating in the margarine during manufacture from about 0.01 percent to about 0.1 percent of sodium caseinate.

It is believed that sodium caseinate potentiates salt taste in milk-free margarines by a mechanism which disrupts the emulsion to the extent required to release the salt ingredient. The emulsion is much tighter in a milk-free margarine, which prevents or retards the release of salt flavor in the mouth. The foregoing is a theory by which the inventor believes the objects of the instant invention are accomplished, but to which he has no wish to be held.

The term "margarine" as used herein refers to a plastic food product comprising at least 80 percent fat having emulsified thereon not more than 20 percent of an aqueous phase, whole composition basis, meeting the standards set forth in the Standards of Identity of the Food and Drug Administration. More particularly the term "margarine" as applied to the product of the instant invention refers to a product falling within that portion of the Standards wherein water is permitted as the aqueous phase.

In the use of the term "milk-free margarine," sodium caseinate is not considered to be a component of milk, wherein the casein is not present as the sodium salt.

The margarines of the present invention may optionally contain permissible additives, such as butter, salt, citric acid isopropyl citrate, stearyl citrate, calcium disodium ethylenediaminetetraacetate, monoglycerides, diglycerides, lecithin, vitamins, colorants, flavoring substances, potassium sorbate, etc.

The fat phase may contain any triglyceride oil permitted in the Standards of Identity. Among the useful oils and fats there may be mentioned coconut oil, tallow, corn oil, safflower oil, sunflower oil, soybean oil, and any rendered fat of cattle, sheep, swine, or goats, or stearine derived therefrom. The triglycerides will be carefully formulated with due regard to unsaturation, trans-acid content, molecular rearrangement, etc. to provide print or soft margarines having desired properties. The composition and character of the fat phase however does not constitute an inventive aspect of the instant invention.

The fat phase of the margarine will constitute at least 80 percent of the total margarine emulsion. Margarines within the invention include those having a slightly higher fat content, for example about 85 percent. The fat content may be even higher, but a range of about 80 percent to about 85 percent allows sufficient water to dissolve comfortably an amount of salt in the aqueous phase which is appropriate to provide, along with about 0.01 percent to about 0.1 percent sodium caseinate, a salt taste which over the years has been accepted by margarine consumers.

The aqueous phase complements the fat phase in percentage level, and ranges from about 15 percent to about 20 percent of the total of the fat and aqueous phases.

The salt (NaCl) level is limited in the margarines of the instant invention by considerations of bacteriological stability at the lower salt levels and dietary and taste reasons at the upper salt levels. The salt content of the margarines within the present invention ranges between about 1 percent and about 3 percent. The preferred range is about 1.7 percent to about 2.5 percent salt. Less than about 1.5 percent salt increases the danger of bacterial spoilage and further increases the danger of emulsion instability due to the greater proportion of sodium caseinate required to compensate for the lower salt level. A level of 4 percent salt can be used, although at this level the margarine has a bitter taste to some consumers, and this high level would be undesired by persons who are conscious of their salt intake and who may rely upon the customary salt level of about 2 percent to judge their consumption of margarine. At the 4 percent level also there is likelihood of salt-crystal formation on storage.

The proportions of sodium caseinate range from about 0.01 percent to about 0.1 percent, and proportions within these limits will generally be employed in inverse order with respect to the proportions of salt. For example 0.01 percent sodium caseinate can be used with 3–4 percent salt and 0.1 percent sodium caseinate used with 1–2 percent salt. These relative proportions however are disclosed herein to serve only as guides, and it is contemplated that proportions of both sodium caseinate and salt will be selected within the disclosed limits to provide an improved salt sensation within the variable salt-taste levels acceptable among margarine consumers. Normally the proportions of sodium caseinate will range between about 0.02 percent and about 0.07 percent, a level of 0.03 percent being especially preferred in print margarines having no milk and having about 2 percent salt. The degree of hardness of the water used to make the margarine will influence the level of sodium caseinate to be used. Sodium caseinate is insolubilized by hardness ions, e.g., calcium and magnesium ions, and the harder the water, the more caseinate will be required. For example at about 100 parts per million hardness as $CaCO_3$, levels of sodium caseinate within the lower portion of the claimed range of about 0.01 percent to about 0.1 percent are adequate. At higher hardness levels, for example about 250–300 parts per million the upper portion of this range may be used.

With reference to the process of preparing the margarines of the invention, the sodium caseinate may be incorporated into the aqueous phase, except for levels at and near 0.1 percent, at which the sodium caseinate is more readily incorporated in the fat phase as set forth in Example 2, hereinafter.

Sodium caseinate may be prepared by methods well known in the art. In one procedure, skim milk is slowly acidified with dilute acetic acid under continuous stirring, avoiding heating above room temperature. By this step, casein is precipitated. The precipitated casein is separated from the aqueous acidic medium by filtration or by centrifugation. The liquid is discarded and the collected precipitate is dissolved in aqueous medium hydroxide, avoiding an excess. Any precipitate remaining at this point is removed by filtration or centrifugation, and the sodium caseinate in solution is acidified with acetic acid to a pH of 4.7 to precipitate casein as a means of further purification. The precipitate is separated as described above and dissolved in aqueous sodium hydroxide to a pH of 7. The sodium caseinate is recovered by any well-known means, preferably by drying in vacuo over a desiccant. The recovered dry sodium caseinate is powdered and extracted with anhydrous ether or petroleum ether to remove any remaining fatty substances. The sodium caseinate prepared as above is practically tasteless, and is devoid of any saline taste attributed to a product described in U.S. Pat. No. 1,412,462, mentioned hereinafter, as a composition consisting of casein and an alkaline earth hydroxide.

Suitable sodium caseinate preparations may also be made by methods described in U.S. Pat. No. 3,266,904 and U.S. Pat. No. 3,420,811.

The degree of salt sensation effected by the instant invention is not limited to a specific level, but it is within the ambit of the invention to provide both soft and print tub margarines wherein the salt sensation may vary over a reasonable range within the variable limits of consumer acceptability. This demonstrated in the following Examples, which are to be considered as not limitative, but as exemplary of the best mode of carrying out the instant invention.

EXAMPLE 1

To 17.4 parts of water, having a hardness of about 100 ppm as $CaCO_3$, a premix consisting of 0.1 part sodium benzoate, 0.0075 parts calcium disodium ethylenediaminetetraacetate, 2 parts sodium chloride (margarine quality — low free copper salt) and 0.02 parts sodium caseinate is added and mixed. The aqueous phase is then pasteurized 20 minutes at 180° F and cooled to 50° F. The oil phase is prepared in a margarine churn by combining 80 parts margarine oil blend (a blend of hydrogenated and liquid cottonseed and soybean oils having an $SFI_{21.1}$ of 11–15; $SFI_{33.3}$ of 1–5)

monoglyceride concentrate (45 percent mono) 0.2 part, lecithin 0.2 part, color (5,500 units/lb. beta carotene), and vitamin A to provide 16,000 units/lb. and a suitable imitation butter flavor. The water phase is added to the oil phase in the churn while stirring so as to prepare a water-in-oil emulsion. The emulsion in the churn at 94°–100° F is quick-chilled with conventional scraped surface heat exchangers (Votator A units) and then extruded in stick form and wrapped.

When a 30-member taste-preference panel compares the product with a conventional margarine having milk as the aqueous phase, but containing no sodium caseinate and no disodium calcium ethylenediaminetetraacetate but otherwise prepared as above, sixteen members prefer the taste of the conventional margarine and 11 members prefer the taste of the milk-free margarine. Three members can detect no difference. These figures indicate a slight overall preference for the taste of the conventional milk margarine, but also indicate that the taste of the milk-free margarine is commercially acceptable in view of the fact that substantially as many panelists (14:16) consider that the milk-free margarine with 0.02 percent sodium caseinate is as good or better than the commercial product, which is one well-known for its excellent taste.

When the margarine prepared as above is stored along with the aforementioned commercial margarine for 11 weeks at 45° F, both products are considered to be equal in flavor characteristics.

The notation SFI with subscripts as used hereinabove and in Example 6 refers to the Solid Fat Index of the fat blend, calculated from dilatometer measurements as described in AOCS Tentative Method Cd—57 (1961). The subscripts are the temperatures in degrees centigrade at which the SFI values are obtained.

The 30-member taste-preference panel mentioned hereinabove is composed of Research personnel, employees of the instant assignee. About one-half of the panelists are experts in the tasting of margarine; all are selected for their acuity of judgement and their skill in determining taste differences and preference.

The panels mentioned hereinafter are composed of substantially the same personnel as the Example 1 panel except for an occasional substitution for reasons beyond the control of applicant.

EXAMPLE 2

A margarine is prepared as described in Example 1 except that the sodium caseinate is incorporated at a level of 0.10 percent, and is slurried with twice its weight of the margarine oil blend of Example 1 and dispersed in the oil phase.

Twenty-two members of a 30-member taste panel consider that the aforementioned product is saltier than the commercial milk margarine described in Example 1.

EXAMPLE 3

A margarine is prepared in accordance with Example 1 except that the proportion of sodium caseinate is 0.05 percent by weight based on the whole margarine composition. This margarine, designated as A, is compared with a control having a commercial formula with milk as the aqueous phase but with no sodium caseinate and no disodium calcium ethylenediaminetetraacetate. This control margarine is designated B. The two margarines are compared for salt sensation, and for discoloration during the frying of chicken, eggs, and potatoes and the preparation of a grilled cheese sandwich.

Salt Sensation:

In a panel of 30 persons evaluating margarines A and B for salt sensation, 19 judge margarine A to be saltier, nine judge margarine B to be saltier, and two attribute equal saltiness to both margarines.

When margarine A, containing no milk and 0.05 percent sodium caseinate is compared with a control margarine C, containing no milk and no sodium caseinate, all 30 panel members can detect the saltier taste of margarine A, showing that the salt taste is contributed by the sodium caseinate.

Fried Chicken — Southern Style:

Chicken wings are coated with breading and fried in an electric frying pan, using in separate tests, margarines A and B as frying fats. During the first-stage browning step margarine B, containing milk, darkens considerably with charring, while the experimental margarine A darkens very little. After frying, the chicken pieces fried in experimental margarine A are much lighter in color and more appetizing in appearance than are the pieces fried in the control having milk as the aqueous phase.

Fried Eggs:

Pan-fried eggs carefully fried over a gas flame in margarines A and B exhibit no difference in appearance. However in additional tests, when the gas flame is adjusted slightly higher than the minimum required for frying, the control margarine B darkens and the eggs fried therein are discolored and unappetizing in appearance, while the margarine A, having no milk and 0.05 percent sodium caseinate, does not darken, and the eggs fried therein are as light in color as those fried under minimum heat conditions.

French-Fried Potatoes and Grilled Cheese Sandwiches:

No noticeable differences in the performances or color is observed in margarines A and B when used to fry raw potato cubes over a medium gas flame for 20 minutes, or when used to prepare a grilled cheese sandwich over a low gas flame.

EXAMPLE 4

A margarine is prepared as described in Example 1 except that the sodium caseinate is incorporated at a level of 0.01 percent and the salt is incorporated at a level of 3 percent, both percentages being on the whole composition basis.

A margarine thus prepared is comparable to the margarine of Example 1 with respect to salt sensation and substantial freedom from darkening when used for frying foodstuffs.

EXAMPLE 5

Two batches of milk-free margarine are prepared following the direction provided in Example 1. One batch contains 0.03 percent by weight, whole composition basis, of sodium caseinate. The second batch contains 0.04 percent sodium caseinate but otherwise has the composition of Example 1.

A 30-member taste preference panel in a test comparing the two aforementioned margarines with the conventional margarine described in Example 1, shows a slight preference for the taste of the conventional margarine, 15 to 12 and 16 to 11 respectively, three members in each instance being unable to detect any difference. The taste of the two milk-free margarines is considered to be commercially acceptable, as attested by the high number, 15:15 and 14:16 respectively who judge the aforementioned milk-free margarines to be equal or better in taste than the commercial milk margarine.

After storing 5 months at 45° F all three margarines are considered to be equivalent in taste, and within the limits of acceptability.

EXAMPLE 6

A margarine of the "tub" or soft type is prepared in the manner described in Example 1 except that the level of sodium caseinate is 0.03 percent, and the fat component is a blend of 85 parts of partially hydrogenated soybean oil and 15 parts of unhydrogenated cottonseed oil, the blend having an $SFI_{21.1}$ of 6.5, an $SFI_{33.3}$ of 1.8, and an $SFI_{40}$ of 0. The emulsion, after leaving the Votator A unit, is run in a semi-fluid state at a temperature of about 11° C to about 13° C into 8-ounce containers and held at a temperature of about 7° C until firm.

This product is judged to be an improvement over a commercial soft margarine having milk solids in the aqueous phase with respect to discoloration and burning during frying. In a taste comparison by a 30-member panel, the milk-free soft margarine is judged to have acceptable organoleptic properties, and considered more salty than the commercial soft margarine mentioned above by 13 out of 30 panel members.

EXAMPLE 7

A soft margarine having the composition of the product of Example 6, except that the proportion of sodium caseinate is 0.04 percent, is within the instant invention. The higher proportion of sodium caseinate relative to that of Example 6 improves the salt sensation to a greater degree than that of the product of Example 6.

Having described the invention, modifications within the spirit thereof will be readily apparent to persons skilled in the art, and it is not intended that the invention be limited to the best modes exemplified but limited only within the scope and spirit of the appended claims.

What is claimed is:

1. A margarine comprising an emulsion of a fatty continuous phase and an aqueous disperse phase, said margarine containing from about 0.01 percent to about 0.1 percent sodium caseinate, about 1 percent to about 3 percent NaCl, and being free from milk components, said percentages being based on the whole margarine composition.

2. A margarine in accordance with claim 1 wherein said fatty continuous phase constitutes from 80 percent to about 85 percent by weight of said margarine.

3. A margarine in accordance with claim 1 wherein said margarine is in print form.

4. A margarine in accordance with claim 1 wherein said margarine is in soft tub form.

5. A process for enhancing the salt sensation of milk-free margarine, comprising incorporating in said margarine during manufacture from about 0.01 percent to about 0.1 percent of sodium caseinate.

* * * * *